United States Patent
Nijakowski et al.

(10) Patent No.: US 11,945,424 B2
(45) Date of Patent: Apr. 2, 2024

(54) METHOD FOR AUTOMATICALLY DECELERATING A VEHICLE

(71) Applicant: Robert Bosch GmbH, Stuttgart (DE)

(72) Inventors: Klaus-Dieter Nijakowski, Heilbronn (DE); Andreas Englert, Suzhou (CN); Tobias Putzer, Flein (DE)

(73) Assignee: Robert Bosch GmbH, Stuttgart (DE)

( * ) Notice: Subject to any disclaimer, the term of this patent is extended or adjusted under 35 U.S.C. 154(b) by 840 days.

(21) Appl. No.: 16/461,516

(22) PCT Filed: Sep. 22, 2017

(86) PCT No.: PCT/EP2017/074009
§ 371 (c)(1),
(2) Date: May 16, 2019

(87) PCT Pub. No.: WO2018/091177
PCT Pub. Date: May 24, 2018

(65) Prior Publication Data
US 2019/0283720 A1 Sep. 19, 2019

(30) Foreign Application Priority Data
Nov. 16, 2016 (DE) ................ 10 2016 222 522.7

(51) Int. Cl.
*B60T 7/12* (2006.01)
*B60T 8/88* (2006.01)
*B60T 13/74* (2006.01)

(52) U.S. Cl.
CPC ............ *B60T 7/12* (2013.01); *B60T 8/885* (2013.01); *B60T 13/74* (2013.01);
(Continued)

(58) Field of Classification Search
CPC ..... B60T 8/88; B60T 8/92; B60T 7/12; B60T 15/041; B60T 2270/40; B60T 2270/402;
(Continued)

(56) References Cited

U.S. PATENT DOCUMENTS

| 9,821,781 B1* | 11/2017 | Karpenko | B60T 7/042 |
| 2008/0164753 A1* | 7/2008 | Crombez | B60W 20/15 |
| | | | 303/114.3 |

(Continued)

FOREIGN PATENT DOCUMENTS

| CN | 104417520 A | 3/2015 |
| DE | 10 2004 004 992 A1 | 9/2005 |

(Continued)

OTHER PUBLICATIONS

Williams, Advanced Brake Diagnostic Tools, Aug. 1, 2005, Brake & Front End, https://www.brakeandfrontend.com/advanced-brake-diagnostic-tools/ (Year: 2005).*
(Continued)

*Primary Examiner* — Russell Frejd
*Assistant Examiner* — Sara J Lewandroski
(74) *Attorney, Agent, or Firm* — Maginot, Moore & Beck LLP

(57) ABSTRACT

A braking system for automatic driver-independent deceleration of a vehicle includes a hydraulic vehicle brake and a backup braking system. The hydraulic vehicle brake includes an adjustable brake pressure control device. A method for automatic driver-independent deceleration of a vehicle includes decelerating the vehicle by actuating a braking pressure control device and, in response to a set point valve set in a hydraulic vehicle brake exceeding a threshold value, actuating a backup braking system.

15 Claims, 3 Drawing Sheets

(52) U.S. Cl.
CPC ..... *B60T 2201/10* (2013.01); *B60T 2270/403* (2013.01); *B60T 2270/413* (2013.01)

(58) Field of Classification Search
CPC ... B60T 8/32; B60T 8/885; B60T 8/94; B60T 8/34; B60T 8/40; B60T 8/4004; B60T 8/4036; B60T 8/90; B60T 8/96; B60T 2201/10; B62D 15/0285; B60W 30/06
See application file for complete search history.

(56) References Cited

U.S. PATENT DOCUMENTS

| | | | | |
|---|---|---|---|---|
| 2012/0256480 | A1* | 10/2012 | Vollert | B60T 8/4845 303/114.1 |
| 2015/0032323 | A1* | 1/2015 | Nijakowski | B60W 30/06 701/23 |
| 2015/0283987 | A1* | 10/2015 | Bareiss | B60T 8/171 701/70 |
| 2019/0039583 | A1* | 2/2019 | Besier | B60T 8/4872 |

FOREIGN PATENT DOCUMENTS

| | | | | |
|---|---|---|---|---|
| DE | 10 2012 202 175 | A1 | 8/2013 | |
| EP | 1 752 351 | B1 | 4/2009 | |
| JP | H05-193468 | A | 8/1993 | |
| JP | H11-139278 | A | 5/1999 | |
| JP | 2008-507443 | A | 3/2008 | |
| JP | 2015-509455 | A | 3/2015 | |
| WO | WO-0232731 | A1 * | 4/2002 | ............. B60T 17/22 |
| WO | 2006/010735 | A1 | 2/2006 | |
| WO | WO-2006010735 | A1 * | 2/2006 | ............ B60T 13/746 |
| WO | 2010/146158 | A2 | 12/2010 | |
| WO | WO-2014135370 | A1 * | 9/2014 | ............ B60T 8/4081 |

OTHER PUBLICATIONS

International Search Report corresponding to PCT Application No. PCT/EP2017/074009, dated Nov. 28, 2017 (German and English language document) (7 pages).

* cited by examiner

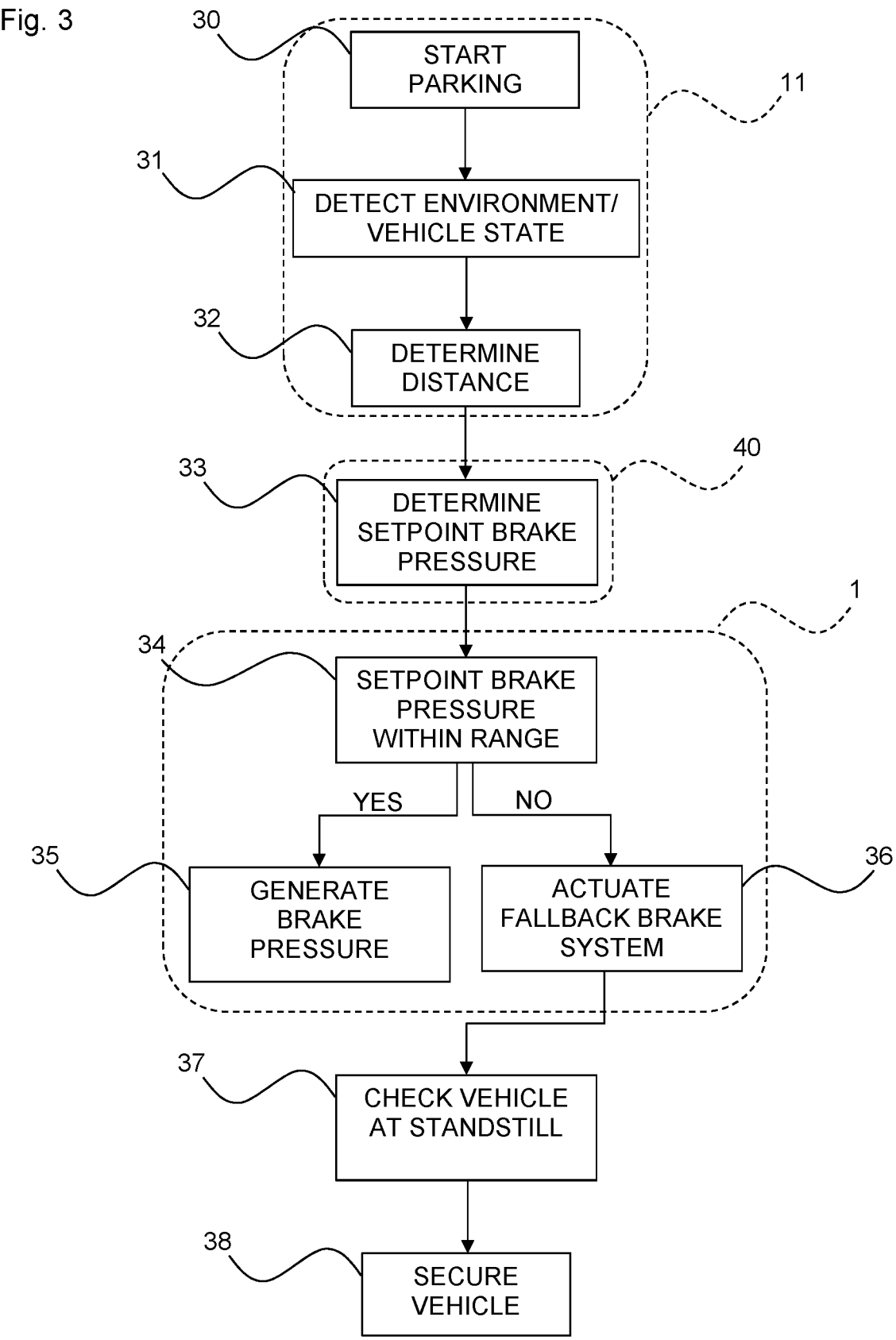

METHOD FOR AUTOMATICALLY DECELERATING A VEHICLE

This application is a 35 U.S.C. § 371 National Stage Application of PCT/EP2017/074009, filed on Sep. 22, 2017, which claims the benefit of priority to Serial No. DE 10 2016 222 522.7, filed on Nov. 16, 2016 in Germany, the disclosures of which are incorporated herein by reference in their entirety.

The disclosure concerns a method for automatically, driver-independently decelerating a vehicle that is equipped with a brake system with a hydraulic vehicle brake and with a fallback brake system.

BACKGROUND

From DE 10 2004 004 992 A1 a brake system for a vehicle is known that comprises a hydraulic vehicle brake and an electromechanical brake device with an electric brake motor. In the normal braking mode the hydraulic vehicle brake is activated to decelerate the vehicle. The electromechanical brake device is used as a parking brake and produces a brake force by means of the electric brake motor when the vehicle is at a standstill, wherein the electric brake motor acts on the same brake piston as the hydraulic vehicle brake and moves a brake lining on the end face of the brake piston against a brake disk.

SUMMARY

The method according to the disclosure is used for automatic and driver-independent deceleration of a vehicle that is equipped with a hydraulic vehicle brake. The hydraulic vehicle brake comprises wheel brake devices on the vehicle wheels, each of which is supplied by means of a brake circuit of the vehicle brake with hydraulic fluid that moves a brake piston against a brake disk. The hydraulic brake pressure can be adjusted using a brake pressure adjuster, for example an electronic stability program (ESP) with a motor-driven hydraulic pump, wherein the brake pressure adjuster can be adjusted to a defined setpoint value by means of a controller.

The brake system of the vehicle also comprises a fallback brake system that can be activated in cases in which the hydraulic vehicle brake partly or completely fails, in particular because of a defect, and cannot provide the desired hydraulic brake pressure. The fallback brake system is either an additional brake device integrated in the hydraulic vehicle brake, such as for example a further brake pressure adjuster, in particular an electromechanical brake force booster, wherein the fallback brake system can be actuated independently of the further components of the hydraulic vehicle brake. The fallback brake system may also be based on a non-hydraulic manner of operating, for example in the implementation as an electromechanical brake device with an electric brake motor, which either acts on the same brake piston as the hydraulic vehicle brake or on a separate brake piston.

To carry out the automatic deceleration process as a rule—when the hydraulic vehicle brake is working—the vehicle is decelerated by operating the brake pressure adjuster. This is carried out in defined braking situations that require that the brake pressure adjuster in the hydraulic vehicle is activated, for example during an automatically and driver-independently performed vehicle parking process. The activation of the brake pressure adjuster is carried out in a controlled manner by determining by sensor one or more vehicle state variables and/or environmental variables and producing in a controller of the hydraulic vehicle brake a setpoint value for the brake pressure adjuster to which the brake pressure adjuster is adjusted. For example, for carrying out an automatic parking process the available braking distance to a standstill of the vehicle is continuously determined by sensor and used as the basis of the calculation of a setpoint value for the brake pressure adjuster in the hydraulic vehicle brake.

With the method according to the disclosure, the fallback brake system is activated to produce a brake force for the case in which the setpoint value, which is automatically continuously determined, exceeds a threshold value in the controller of the hydraulic vehicle brake. In this case, an increased probability of a defect in a component of the hydraulic vehicle brake must be assumed. In the case of comfort-oriented braking processes such as for example an automatic and driver-independent vehicle parking process, also in the general case, when the vehicle brake is working, only relatively low hydraulic brake pressures are produced. If the brake pressure continues to rise because of a defect in the hydraulic vehicle brake by the controller seeking to decelerate the vehicle to a standstill within the available braking distance, then this indicates a defect if the setpoint value exceeds the associated threshold value. In this case, the fallback brake system can be activated to produce a brake force additionally or exclusively. This enables the automatically and driver-independently performed braking process to be brought to an end in the desired manner and without significant loss of comfort or safety.

The method is preferably carried out to perform an automatic parking process. It is however also possible in general to carry out the method during an automatic, driver-independent braking process, in which a setpoint value is continuously and adaptively determined in the controller that is associated with the adjustable brake pressure adjuster, in order to decelerate the vehicle in such a way that defined boundary conditions are maintained, for example a maximum available braking distance or a maximum permissible braking deceleration for comfort reasons.

According to an advantageous embodiment, the setpoint value, which is continuously and adaptively determined and is fed to the controller as an input value, is the setpoint brake pressure in the hydraulic vehicle brake. The setpoint brake pressure can be adjusted by operating the brake pressure adjuster in the hydraulic vehicle brake. However, other setpoint values are also considered, which are fed to the controller of the brake pressure adjuster as input values, for example the continuously determined remaining residual braking distance, the brake force, the braking deceleration or similar.

The fallback brake system, which is activated on exceeding the threshold value, is preferably a holding or parking brake, which is implemented as an electromechanical brake device with an electric brake motor. The electromechanical brake device is usually designed for the continuous generation of a holding or parking brake force that is used for holding the vehicle at a standstill. The electromechanical brake device may also be used in a travelling vehicle to produce a brake force, in particular in the case of exceeding a setpoint value in the hydraulic vehicle brake as mentioned above.

Additionally or alternatively to the electromechanical brake device, the fallback brake system can also be present in the form of a second hydraulic brake pressure adjuster that is correspondingly activated if the setpoint value in the hydraulic vehicle brake exceeds the threshold value. The second hydraulic brake pressure adjuster, for example an electromechanical brake force booster, is not activated during the automatic, driver-independent deceleration process as a general rule, when components of the hydraulic vehicle brake are working, and is only used in the case in which the setpoint value in the hydraulic vehicle brake exceeds the threshold value.

The first brake pressure adjuster, which is activated as a rule during the automatic and driver-independent deceleration process, is preferably the hydraulic pump of the electronic stability program ESP. In the associated regulating or control device, actuating signals for actuating the hydraulic pump are generated based on the delivered setpoint values.

The first brake pressure adjuster, which is activated as a rule during the automatic and driver-independent deceleration process, may be formed by the electromechanical brake force booster in the hydraulic vehicle brake. The fallback brake system is in this case either the hydraulic pump of the ESP system or the electromechanical brake device with the electric brake motor.

In the case of an automatic parking process, according to a further advantageous embodiment after reaching a standstill the vehicle is continuously secured against rolling away using a holding brake. The holding brake is in particular the electromechanical brake device with the electric brake motor, which moves the brake piston against the brake disk.

Additionally or alternatively to the holding brake, once at a standstill the vehicle can also be continuously secured against rolling away using a transmission ratchet in the gearbox of the vehicle.

The aforementioned steps of the method are executed in a regulating or control device, in which actuating signals for actuating the different components of the brake system are produced.

Furthermore, the disclosure concerns a brake system in a vehicle comprising a hydraulic vehicle brake with an adjustable brake pressure adjuster and a fallback brake system for producing additional brake force. The brake system also comprises the regulating or control device for actuating the adjustable components of the brake system. In the regulating or control device, setpoint values are also produced for actuating a controller that can be a component of the regulating or control device and in which actuating signals are produced for actuating the brake pressure adjuster in the hydraulic vehicle brake or for actuating the fallback brake system.

BRIEF DESCRIPTION OF THE DRAWINGS

Further advantages and advantageous embodiments are to be found in the further claims, the description of the figures and the drawings. In the figures:

FIG. 3 shows a flow chart with steps of the method for automatic, driver-independent deceleration of a vehicle.

DETAILED DESCRIPTION

Figure 1:
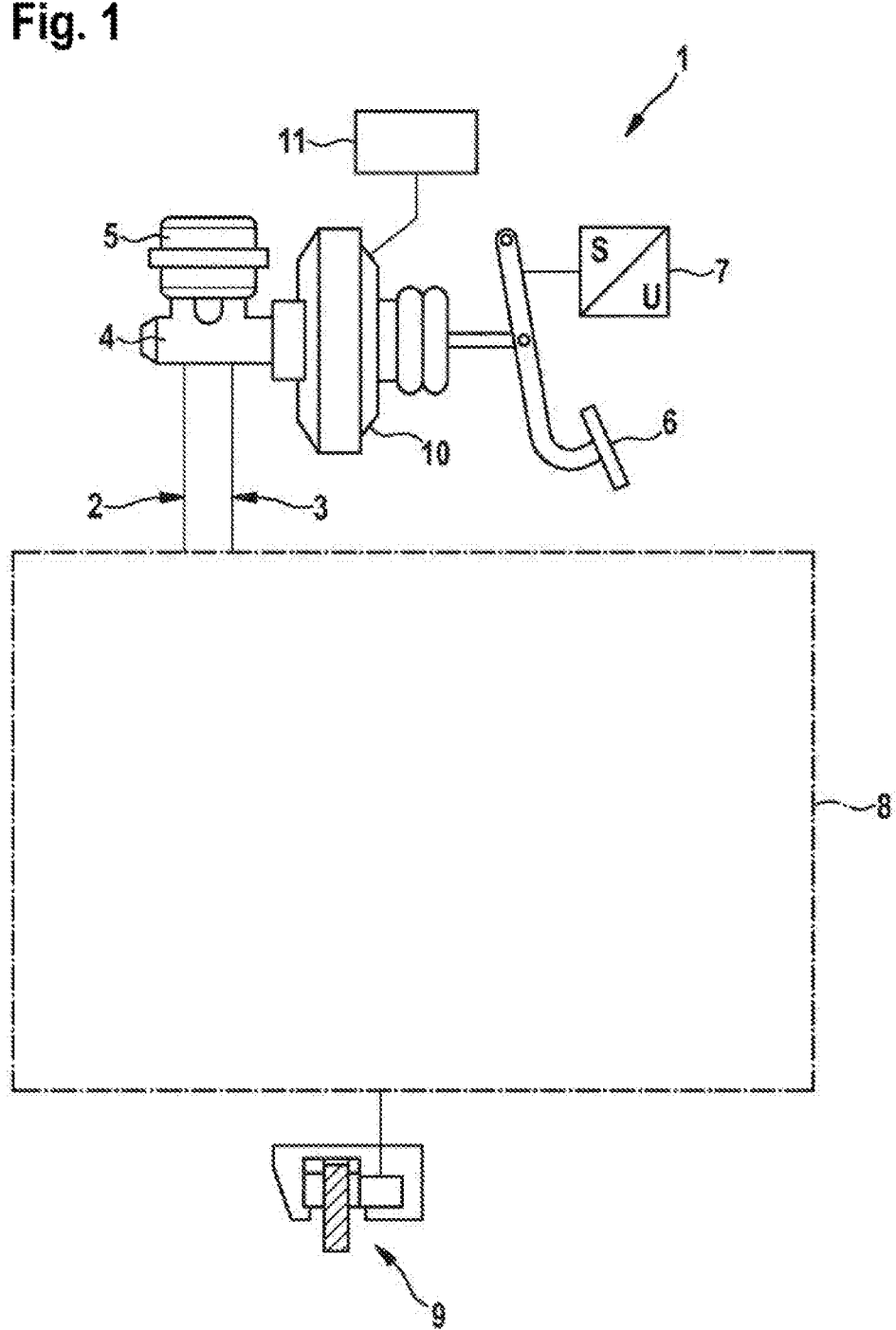
FIG. 1 shows a schematic representation of a hydraulic vehicle brake with a brake force booster, wherein the wheel brake devices of the vehicle brake on the rear axle of the vehicle are additionally fitted with an electromechanical brake device with an electric brake motor.

In the figures identical components are given the same reference characters.

The hydraulic vehicle brake 1 represented in FIG. 1 for a vehicle comprises a front axle brake circuit 2 and a rear axle brake circuit 3 for supplying and actuating wheel brake devices 9 on each wheel of the vehicle with a brake fluid under brake pressure. The two brake circuits 2, 3 are connected to a common master brake cylinder 4 that is supplied with brake fluid by means of a brake fluid reservoir 5. The master brake cylinder piston within the master brake cylinder 4 is operated by the driver by means of the brake pedal 6, the pedal travel caused by the driver being measured by means of a pedal travel sensor 7. Between the brake pedal 6 and the master brake cylinder 4 there is an electromechanical brake force booster 10 comprising an electric motor that is preferably operated by means of a gearbox of the master brake cylinder 4. The electromechanical brake force booster 10 forms a brake pressure adjuster that may also be actuatable driver-independently for automatic generation of a brake pressure.

The actuation movement of the brake pedal 6 measured by the pedal travel sensor 7 is transmitted as a sensor signal to a regulating or control device 11, in which actuating signals for actuating the brake force booster 10 are produced. The supply of the wheel brake devices 9 with brake fluid is carried out in each brake circuit 2, 3 by means of different switching valves, which in common with further units are part of a brake hydraulic system 8. The brake hydraulic system 8 includes furthermore a hydraulic pump, which is a component of an electronic stability program (ESP). The hydraulic pump of the electronic stability program also forms a brake pressure adjuster for driver-independent, automatic generation of a brake pressure. The hydraulic pump is also actuated by the regulating or control device 11.

Figure 2:
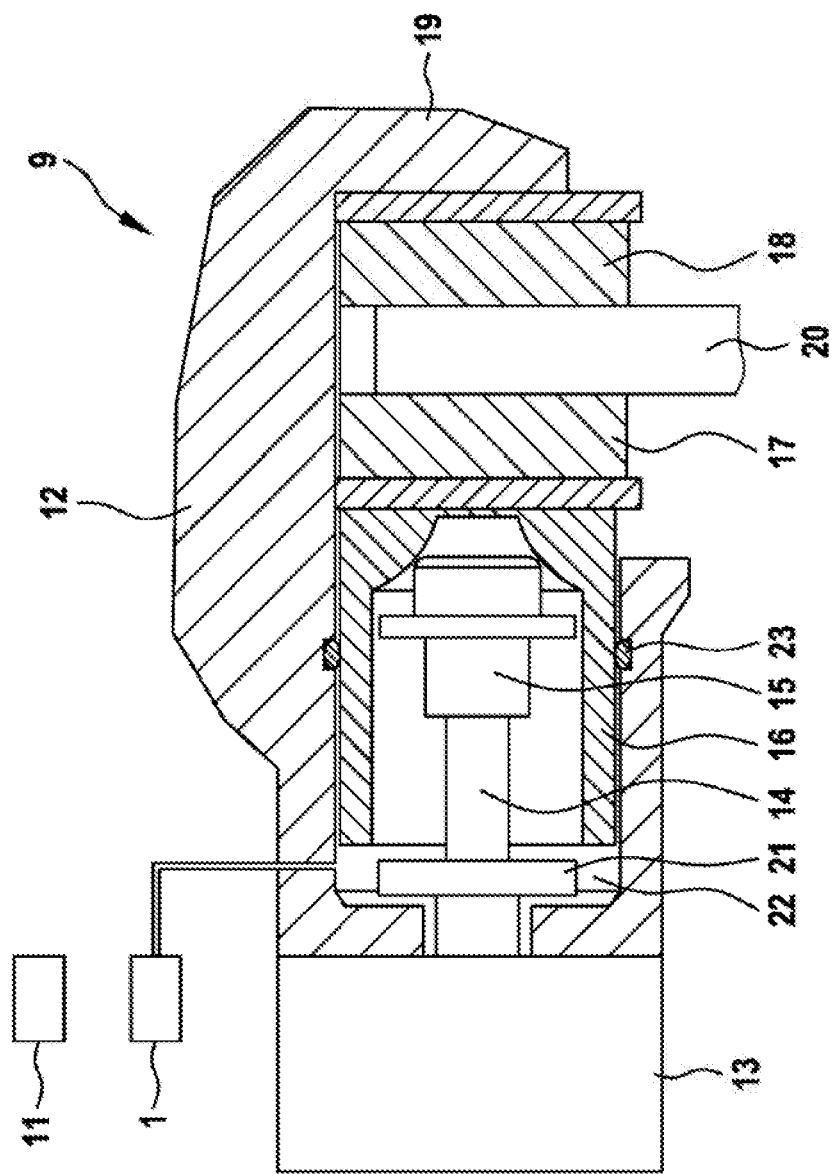
FIG. 2 shows a section through an electromechanical brake device with an electric brake motor.

In FIG. 2 the wheel brake device 9, which is disposed on a wheel on the rear axle of the vehicle, is represented in detail. The wheel brake device 9 is part of the hydraulic vehicle brake 1 and is supplied with brake fluid 22 from the rear axle brake circuit. The wheel brake device 9 comprises moreover an electromechanical brake device, which is preferably used as a holding brake for holding a vehicle at a standstill but can also be used to decelerate the vehicle during movement of the vehicle, in particular at low vehicle speeds below a speed threshold value.

The electromechanical brake device comprises a brake caliper 12 with a jaw 19 enveloping a brake disk 20. As an actuator element, the brake device comprises a d.c. electric motor as a brake motor 13, the rotor shaft of which rotationally drives a spindle 14 on which a spindle nut 15 is rotationally fixedly supported. During rotation of the spindle 14 the spindle nut 15 is axially displaced. The spindle nut 15 moves within a brake piston 16 that is the support for a brake lining 17, which is pressed against the brake disk 20 by the brake piston 16. On the opposite side of the brake disk 20 there is a further brake lining 18, which is positionally fixedly mounted on the jaw 19. The brake piston 16 is sealed pressure tight on the exterior thereof with respect to the accommodating housing by means of an enveloping sealing ring 23.

Within the brake piston 16 the spindle nut 15 can move during a rotational movement of the spindle 14 axially forwards towards the brake disk 20 or during an opposite rotational movement of the spindle 14 axially rearwards until reaching an end stop 21. To produce a clamping force the spindle nut 15 acts on the inner end face of the brake piston 16, whereby the brake piston 16, which is supported so as to be axially displaceable in the brake device, is pressed with the brake lining 17 against the facing end face of the brake disk 20. The spindle nut 15 is a transmission element between the brake motor and the brake piston.

For the hydraulic brake force the hydraulic pressure of the brake fluid 22 from the hydraulic vehicle brake 1 acts on the brake piston 16. The hydraulic pressure can also be effective in a supportive sense when the vehicle is at a standstill during operation of the electromechanical brake device, so that the total brake force is composed of the electromotive component and the hydraulic component. While the vehicle is travelling, either only the hydraulic vehicle brake is active, or both the hydraulic vehicle brake and the electromechanical brake device are active or only the electromechanical brake device is active in order to produce brake force. The actuating signals for actuating both the adjustable components of the hydraulic vehicle brake 1 and the electromechanical wheel brake device 9 are produced in the regulating or control device 11.

During an automatic and driver-independent parking process, the vehicle must be decelerated without driver intervention and with high reliability. Based on sensor-determined information, for example the braking distance that is currently still available during the parking process is continuously determined for this. The hydraulic vehicle brake is actuated to produce a desired setpoint brake pressure by actuating one of the brake pressure adjusters thereof automatically and driver-independently. This is carried out in particular by means of the hydraulic pump of the electronic stability program, which is actuated by means of actuating signals of the regulating and control device 11. The actuation is carried out in a controlled manner by continuous sensor determination of environmental state variables and vehicle state variables, based on which actuating signals for actuating the brake pressure adjuster, in particular the hydraulic pump of the electronic stability program, are produced in a controller. The controller may be implemented as a component of the regulating or control device or even as a unit that is embodied separately therefrom.

FIG. 3 shows a flow chart with steps of the method for automatically and driver-independently decelerating a vehicle during an autonomously performed parking process.

The first step 30 of the method denotes the start of the parking process, which for example is manually triggered by the driver. Using the sensing system in the vehicle, in step 31 environmental information is detected, for example obstacles, and vehicle state variables are determined, such as for example the current speed of the vehicle. Based on this, in the next step 32 the remaining distance for maneuvering and braking the vehicle until reaching the final parking position is determined continuously. Said distance information is used in common with further boundary conditions, such as for example a maximum deceleration that is specified for comfort reasons or a maximum brake force, a setpoint value for the brake system calculated in the following step 33.

The first three steps of the method 30, 31 and 32 are performed in the higher level regulating or control device 11. The calculation of the setpoint value for the automatic actuation of the hydraulic vehicle brake in step 33 belongs by contrast to a distance controller 40, which actuates a brake pressure adjuster in the hydraulic vehicle brake, in particular the hydraulic pump of the electronic stability program. The controller 40 may be a component of the regulating or control device 11. In step 33 of the method a setpoint brake pressure for the hydraulic vehicle brake is determined as the setpoint value.

The setpoint brake pressure from the controller 40 is then fed in the brake system 1 into a control unit according to step 34 of the method, wherein the control unit in turn can be a component of the regulating or control device 11. In the control unit according to step 34 a check is made as to whether the setpoint brake pressure produced lies within a permissible range of values. If this is the case, full functionality of the hydraulic vehicle brake can be assumed and the brake pressure adjuster—the hydraulic pump of the ESP system—of the hydraulic vehicle brake is actuated to produce the desired setpoint brake pressure according to step 35 of the method.

If by contrast the check in step 34 of the method indicates that the setpoint brake pressure exceeds an associated threshold value, then it must be assumed therefrom that because of the continuous active generation of the setpoint brake pressure the increase is due to a defect in a component of the hydraulic vehicle brake. The setpoint brake pressure produced in the controller 40 increases in the event of a defect because the desired vehicle deceleration could not be achieved with the previously generated setpoint brake pressure.

On exceeding the threshold value the process branches from step 34 of the method to the following step 36 of the method and a fallback brake system is actuated, which is actuated in addition to or alternatively to actuation of the brake pressure adjuster according to step 35. The fallback brake system is also a brake pressure adjuster in the vehicle brake, for example the electromechanical brake force booster, which can be actuated driver-independently. Additionally or alternatively, it is also possible to actuate the electromechanical brake device with the electric brake motor in order to achieve a vehicle deceleration, with which the vehicle is decelerated to a standstill within the available braking distance.

In the next step 37 a check is made as to whether the vehicle has come to a standstill. If this is the case, in the last step 38 the vehicle can be secured against rolling away at a standstill either by locking the electromechanical parking or holding brake or by using a transmission ratchet in a gearbox of the vehicle.

The invention claimed is:

1. A method for automatic driver-independent deceleration of a vehicle, the method comprising:
   identifying a first setpoint value for a braking process;
   controlling a brake pressure adjuster during the braking process based upon the identified first setpoint without activating a fallback brake system;
   identifying a second setpoint value for the braking process after controlling the brake pressure adjuster during the braking process based upon the identified first setpoint without operating the fallback brake system;
   in response to the second setpoint value exceeding a threshold value associated with a defect of the brake pressure adjuster, automatically decelerating a vehicle by operating the brake pressure adjuster and the fallback brake system of a brake system of the vehicle to generate a brake force, wherein:
      the brake pressure adjuster is configured to adjust a hydraulic pressure of a hydraulic vehicle brake of the brake system,
      the second setpoint value is automatically determined via a controller of the hydraulic vehicle brake, and
      the second setpoint value is adjustable in the hydraulic vehicle brake.

2. The method as claimed in claim 1, wherein the braking process is performed during an automatic parking process.

3. The method as claimed in claim 1, wherein the second setpoint value is a setpoint brake pressure that is settable in the hydraulic vehicle brake.

4. The method as claimed in claim 1, wherein the second setpoint value is determined based on a braking demand operable to decelerate the vehicle to a standstill.

5. The method as claimed in claim 1, wherein the adjustable brake pressure adjuster is (i) a hydraulic pump allocated to an electronic stability program or (ii) an electromechanical brake force booster.

6. The method as claimed in claim 1, wherein the fallback brake system is an electromechanical brake device including an electric brake motor configured to activate in response to the second setpoint value exceeding the threshold value.

7. The method as claimed in claim 1, wherein the fallback brake system is a second hydraulic brake pressure adjuster configured to activate in response to the second setpoint value exceeding the threshold value.

8. The method as claimed in claim 7, wherein the second hydraulic brake pressure adjuster is an electromechanical brake force booster configured to activate in response to the second setpoint value exceeding the threshold value.

9. The method as claimed in claim 1, wherein the brake pressure adjuster is a hydraulic pump allocated to an electronic stability program configured to activate in response to the second setpoint value exceeding the threshold value.

10. The method as claimed in claim 1, wherein in response to deceleration of the vehicle to a standstill, continuously securing the vehicle against rolling away via a transmission ratchet.

11. The method as claimed in claim 1, wherein in response to deceleration of the vehicle to a standstill, continuously securing the vehicle against rolling away via a holding brake.

12. The method as claimed in claim 1, wherein the method is performed by a regulating or control device.

13. A brake system in a vehicle, comprising:
a hydraulic vehicle brake including a controller;
an adjustable brake pressure adjuster configured to adjust a hydraulic pressure of the hydraulic vehicle brake;
a fallback brake system; and
a regulating or control device configured to
  identify a first setpoint value for a braking process,
  control the adjustable brake pressure adjuster during the braking process based upon the identified first setpoint without operating the fallback brake system,
  identify a second setpoint value for the braking process after controlling the adjustable brake pressure adjuster during the braking process based upon the identified first setpoint without operating the fallback brake system,
  in response to the second setpoint value exceeding a threshold value associated with a defect of the brake pressure adjuster, automatically decelerate the vehicle by operating the adjustable brake pressure adjuster and the fallback brake system to generate a brake force, wherein:
the second setpoint value is automatically determined via the regulating or control device; and
the second setpoint value is adjustable in the hydraulic vehicle brake.

14. The brake system as claimed in claim 13, wherein the fallback brake system is an electromechanical brake device including an electric brake motor.

15. A vehicle, comprising:
a brake system, including:
  a hydraulic vehicle brake having a controller;
  an adjustable brake pressure adjuster configured to adjust a hydraulic pressure of the hydraulic vehicle brake; and
  a fallback brake system; and
  a regulating or control device configured to
    identify a first setpoint value for a braking process,
    control the adjustable brake pressure adjuster during the braking process based upon the identified first setpoint without operating the fallback brake system,
    identify a second setpoint value for the braking process after controlling the adjustable brake pressure adjuster during the braking process based upon the identified first setpoint without operating the fallback brake system,
    in response to the second setpoint value exceeding a threshold value associated with a defect of the brake pressure adjuster, automatically decelerate the vehicle by operating the adjustable brake pressure adjuster and the fallback brake system to generate a brake force, wherein:
the second setpoint value is automatically determined via the regulating or control device; and
the second setpoint value is adjustable in the hydraulic vehicle brake.

* * * * *